July 27, 1926.

H. G. DORSEY

SPEED REGULATOR

Filed August 8, 1919

1,593,819

INVENTOR
Herbert Grove Dorsey
BY
A. J. Gardner
HIS ATTORNEY

Patented July 27, 1926.

1,593,819

UNITED STATES PATENT OFFICE.

HERBERT GROVE DORSEY, OF GLOUCESTER, MASSACHUSETTS, ASSIGNOR TO JOHN HAYS HAMMOND, JR., OF GLOUCESTER, MASSACHUSETTS.

SPEED REGULATOR.

Application filed August 8, 1919. Serial No. 316,187.

Some of the objects of the present invention are: to provide means for regulating the speed of an electrical unit; to provide means for maintaining the speed of an electrical unit substantially constant; to provide means responsive to load variations in an alternating current circuit for regulating the speed of the machine from which the power is derived; to provide means for automatically varying the inductance of an alternating current circuit and thereby controlling the speed of the machine from which the power is derived; and to provide other improvements as will hereinafter appear.

Figure 1:
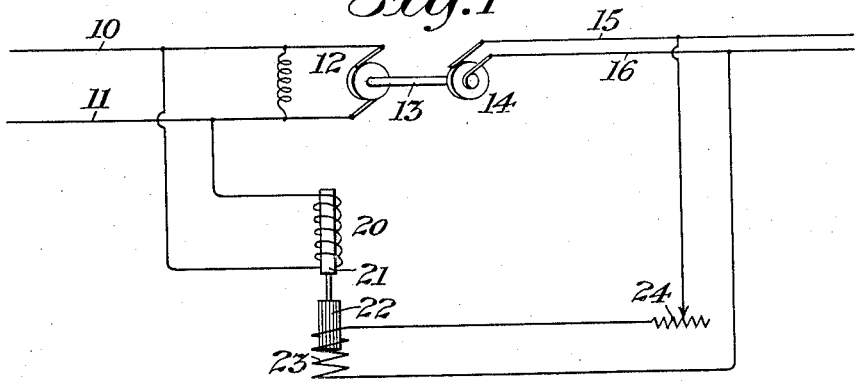
Figure 2:
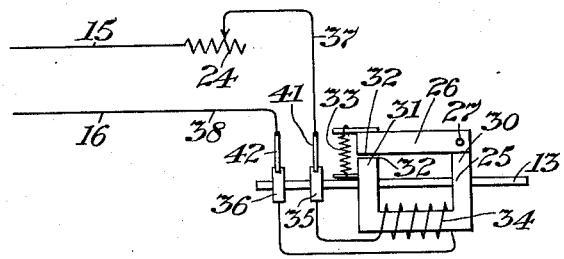
Figure 3:
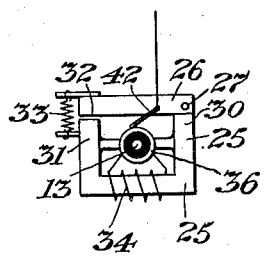
Figure 4:
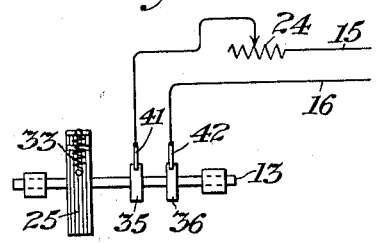

In the accompanying drawings Fig. 1 is a diagrammatic representation of one form of speed regulator for an alternating current generator; Fig. 2 represents a diagrammatic side elevation of another form of the invention; Fig. 3 represents an end elevation of another modification; and Fig. 4 represents a side elevation of the form shown in Fig. 3.

Referring to the drawings, one form of speed governor is shown in Fig. 1 wherein a suitable source of direct current (not shown) is connected by leads 10 and 11 to a direct current motor 12 which is directly connected by a shaft 13 to an alternating current generator 14. From the generator 14 the usual line wires 15 and 16 lead to the point of use as will be understood.

For the purpose of regulating the speed of the alternating current generator 14 to maintain constant the frequency of the current delivered from the generator despite variations in the voltage of the current supplied by the leads 10 and 11, a direct current solenoid 20 is connected across the direct current supply leads 10 and 11 in parallel with the motor 12. The solenoid 20 has a movable core 21 rigidly joined to a laminated plunger 22 of an alternating current solenoid 23, which is connected across the alternating current leads 15 and 16. The plunger 22 serves as the movable core of the solenoid 23 and its position within the solenoid determines the magnetic reluctance of a part of the alternating current circuit. Hence a change of its position serves to vary the inductance of the alternating current circuit. If the direct current supply voltage, for example, increases, the speed of the direct current motor 12 will also increase and thereby increase the speed of the alternating current generator 14. The effect of the increased direct current voltage is to shift the plunger 21 with respect to the coil of the solenoid 20 and consequently shift the laminated plunger 22 of the alternating current solenoid 23 in a direction to decrease the inductance. This action increases the power taken from the alternating current generator 14 and causes the speed of the motor 12 to be decreased.

For purposes of adjustment a non-inductive rheostat 24 may be inserted in the shunt circuit including the solenoid 23.

In Fig. 2 another form of the invention is shown wherein the speed regulator consists of an electromagnet 25 of substantially U-shape, which is made fast to the shaft 13 of the motor-generator set in order to rotate with and at the same speed as the direct current motor 12. An armature 26 is arranged across the poles of the magnet 25, being preferably pivoted at 27 to one of the poles 30 of said magnet and having its free end in close proximity to the other pole 31 of said magnet 25. When the magnet 25 is rotated the armature 26 swings outward under the centrifugal action, establishing an air gap 32 which varies according to changes of the motor speed and therefore tends to keep the speed constant. A spring 33 acts to return the armature 26 to normal position. The magnet 25 which is preferably of laminated iron has a copper winding 34 the terminals of which are electrically bonded respectively to two slip rings 35 and 36 which are mounted fixedly upon the shaft 13 and suitably insulated from each other. The leads 15 and 16 are respectively connected to the slip rings 35 and 36 by wires 37 and 38 which terminate respectively in brushes 41 and 42 having contact bearing upon the rings 35 and 36. One of the wires, as 37, is connected to the rheostat 24 for purposes of regulation as will be understood.

In Figs. 3 and 4 the alternating current electromagnet 25 is arranged transversely of the shaft 13 and fixed thereto for rotation with the generator 14. The centrifugal force of rotation and change of speed of the generator operate in the same manner as in the modification of the invention illustrated in Fig. 2 to vary the width of the air gap 32 with changing speeds, while the slip ring construction carries the current to the magnet 25 in such a manner that no contacts are opened.

From the foregoing it will be evident that in either of the forms shown the magnetic reluctance, for example, inductance, of a part of the alternating current circuit is changed as the voltage of the supply current varies. Thus if the inductance becomes less the power consumed in the alternating current circuit becomes greater and if the inductance becomes greater the power becomes less. With reference to the modifications shown in Figs. 2, 3 and 4, any increase in the speed of the machine widens the air gap thereby increasing the load on the machine and tending to reduce the speed of the machine. Furthermore, by adjusting the armature spring 33 and the rheostat 24 to the desired speed, conditions may be maintained more nearly constant.

Having thus fully described my invention, I claim and desire to protect by Letters Patent:

1. In a speed regulator, the combination with an electric current generator having a rotary element, of means including an input circuit for rotating said element, a circuit arranged to receive energy from said generator and including an impedance, and movable means arranged to be actuated in response to variations of energy in said input circuit to vary said impedance and thereby maintain the speed of said element substantially constant.

2. In a speed regulator, the combination of an electric current generating means including a delivery circuit and an input circuit, and automatic means operatively connected to the input circuit and arranged to vary the inductance of said delivery circuit to maintain the speed of said generating means constant.

3. In a speed regulator, the combination of an electric current generating means including a delivery circuit, electrically driven means for operating said generating means, a supply circuit for said driven means, and means operated by voltage variation in said supply circuit for varying the inductance of said delivery circuit whereby the speed of said generating means is regulated.

4. In a speed regulator, the combination of an electric current generating means including a delivery circuit, electrically driven means for operating said generating means, a supply circuit for said driven means, and means, operated by voltage variation in said supply circuit and including a solenoid, for varying the inductance of said delivery circuit whereby the speed of said generating means is regulated.

5. In a speed regulator, the combination of an electric current generating means including a delivery circuit, electrically driven means for operating said generating means, a supply circuit for said driven means, and means, operated by voltage variation in said supply circuit and including a pair of solenoids, for varying the inductance of said delivery circuit, whereby the speed of said generating means is regulated.

6. In a speed regulator, the combination of an alternating current generator, a delivery circuit therefrom, a direct current motor arranged to drive said generator, a direct current supply circuit connected to drive said motor, and means responsive to voltage variation in said supply circuit for varying the inductance of said delivery circuit to regulate the speed of said motor.

7. In a speed regulator, the combination of an alternating current generator, a delivery circuit therefrom, a direct current motor arranged to drive said generator, a direct current supply circuit connected to drive said motor, and means including a solenoid operated by a change of voltage in said supply circuit for varying the inductance of said delivery circuit.

8. The combination with a rotary alternating current generator provided with an output circuit including a variable impedance, of means for rotating said generator including an electric input circuit, and means controlled by said input circuit, for varying said impedance to regulate the speed of said generator.

9. The combination with a rotary alternating current generator provided with an output circuit including a variable inductance, of means for rotating said generator including an electric motor provided with a supply circuit, and means controlled by said supply circuit for varying said inductance to regulate the speed of said generator.

10. In a speed regulator, the combination of an electric current generating means including a delivery circuit, means for operating the generating means, a reactance device in said circuit comprising relatively movable parts, and means controlled by one of said first-mentioned means for automatically effecting relative movement of said parts to vary the reactance of said device in a manner to maintain the speed of said generating means constant.

11. In a speed regulator, the combination of an electric current generating means including a delivery circuit, electrically driven means for operating said generating means, a supply circuit for said driven means, and means operated by voltage variation in said supply circuit for varying the impedance of said delivery circuit, whereby the speed of said generating means is regulated.

12. The combination with an electric generator having a movable element, of actuating means for moving said element, a circuit arranged to receive electric energy from said generator, said circuit including a variable impedance having a movable member arranged to be actuated in response to variations in the operation of said actuating means, and being effective to so vary said impedance as to maintain the rate of movement of said movable element substantially constant.

13. In an arrangement of the class described, an alternating current generating apparatus comprising a generator and means for driving it, a circuit arranged to receive current from the generator, movable means for changing the impedance of said circuit, and means for automatically moving said means to change the impedance of the circuit in a manner such as to tend to maintain the speed of the generator constant, said last-mentioned means including connections to said apparatus constructed to cause said means to be controlled by the apparatus.

14. In an arrangement of the class described, an alternating current generating apparatus comprising a generator and means for driving it, a circuit arranged to receive current from the generator, an impedance device in said circuit, a movable member for changing the impedance of said device, and means for automatically moving said member under control by said apparatus to change the impedance of the circuit in a manner such as to tend to maintain the speed of the generator constant.

15. In an apparatus of the class described, an alternating current generating apparatus comprising a generator and means for driving it, a circuit arranged to receive current from the generator, an inductance in said circuit, a movable member for changing the impedance of said inductance, and means for automatically moving said member under control by said apparatus to change the impedance of the circuit in a manner such as to tend to maintain the speed of the generator constant.

16. In an apparatus of the class described, an alternating current generating apparatus comprising a generator and means for driving it, a circuit arranged to receive current from the generator, and means operable automatically under control by said apparatus to change the reactance of the circuit to a fixed frequency in a manner such as to tend to maintain the speed of the generator constant.

In witness whereof I have hereunto set my hand this 23d day of July, 1919.

HERBERT GROVE DORSEY